(12) United States Patent
Dedina

(10) Patent No.: US 9,287,064 B2
(45) Date of Patent: Mar. 15, 2016

(54) SWITCHING DEVICE AND METHOD FOR DETECTING MALFUNCTIONING OF SUCH A SWITCHING DEVICE

(71) Applicant: Schneider Electric Industries SAS, Rueil-Malmaison (FR)

(72) Inventor: Gregory Dedina, Vourey (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 0 days.

(21) Appl. No.: 14/494,721

(22) Filed: Sep. 24, 2014

(65) Prior Publication Data

US 2015/0096874 A1 Apr. 9, 2015

(30) Foreign Application Priority Data

Oct. 8, 2013 (FR) ...................................... 13 59739

(51) Int. Cl.
*H01H 3/00* (2006.01)
*H01H 1/50* (2006.01)
(Continued)

(52) U.S. Cl.
CPC ............. *H01H 3/001* (2013.01); *H01H 1/0015* (2013.01); *H01H 1/502* (2013.01); *H01H 50/546* (2013.01);
(Continued)

(58) Field of Classification Search
CPC ................ H01H 3/001; H01H 71/501; H01H 2071/502; H01H 2047/003; H01H 2009/288; H01H 1/0015; H01H 50/546; H01H 1/502; H01H 3/38; H01H 2071/044; H01H 2300/03; H01H 2235/01; H01H 2235/03; H01H 73/045
See application file for complete search history.

(56) References Cited

U.S. PATENT DOCUMENTS

| | | | | | |
|---|---|---|---|---|---|
| 3,920,941 | A | * | 11/1975 | Hundstad | ............. H01H 33/666 218/140 |
| 5,304,753 | A | * | 4/1994 | Parrish | ................... H01H 3/001 200/16 B |
| 5,986,528 | A | * | 11/1999 | Meier | ...................... H01H 1/54 335/129 |

(Continued)

FOREIGN PATENT DOCUMENTS

| | | | |
|---|---|---|---|
| DE | 2813699 A1 * | 10/1979 | .......... H01H 51/065 |
| FR | 2 952 222 A1 | 5/2011 | |
| FR | 2 981 787 A1 | 4/2013 | |
| JP | 1-206531 | 8/1989 | |

OTHER PUBLICATIONS

French Preliminary Search Report issued Aug. 12, 2014 in French Application 13 59739, filed on Oct. 8, 2013 ( with English Translation of Categories of Cited Documents).

*Primary Examiner* — Mohamed Musleh
(74) *Attorney, Agent, or Firm* — Oblon, McClelland, Maier & Neustadt, L.L.P.

(57) ABSTRACT

This switching device comprises at least one pair of fixed contacts and, for each pair of fixed contacts, a movable contact that is movable between a closed position and an open position. A contact holder capable of holding in place each movable contact is also provided. The contact holder is movable along a vertical direction between a first position corresponding to the closed position of each movable contact and a second position corresponding to the open position of the or each movable contact. The device also includes a plate capable of applying a force on the movable contact holder so as to move it between its first and second positions. The plate is movable relative to the movable contact holder. The device includes a sensor capable of measuring the movement of the movable plate relative to the movable contact holder, during the actuation of the movement of the plate in order to drive the movement of the contact holder from its first position to its second position. A detection member for detecting a malfunction in the switching device based on at least one value measured by the sensor is also provided.

15 Claims, 5 Drawing Sheets

(51) Int. Cl.
*H01H 1/00* (2006.01)
*H01H 50/54* (2006.01)
*H01H 71/04* (2006.01)

(52) U.S. Cl.
CPC ...... *H01H 2071/044* (2013.01); *H01H 2235/01* (2013.01); *H01H 2235/03* (2013.01); *H01H 2300/03* (2013.01)

(56) References Cited

U.S. PATENT DOCUMENTS

| | | |
|---|---|---|
| 2008/0036561 A1 | 2/2008 | Hartinger et al. |
| 2009/0144019 A1 | 6/2009 | Elsner et al. |
| 2013/0103334 A1 | 4/2013 | Delbaere et al. |

\* cited by examiner

SWITCHING DEVICE AND METHOD FOR DETECTING MALFUNCTIONING OF SUCH A SWITCHING DEVICE

The invention relates to a switching device and a method for detecting a malfunction in such a device.

The switching device includes at least one pair of fixed contacts and, for each pair of fixed contacts, a movable contact that is movable between a closed position and an open position. More precisely, the fixed contacts are electrically connected to one another, when the movable contact is in the closed position, and electrically isolated from one another, when the movable contact is in the open position. The switching device also includes a contact holder capable of holding the movable contact and an actuator capable of actuating the movement of the contact holder between a first position corresponding to the closed position of the movable contact and a second position corresponding to the open position of the movable contact.

Generally speaking, in the field of switching devices, the technique of detecting the welding of the or each movable contact on the corresponding fixed contacts is already known. The weld corresponds to a weld between the or each movable contact and the corresponding fixed contacts that is not apt to be broken by the actuation of the movement of the contact holder from its first position to its second position. More precisely, the weld corresponds to the presence of a link between one of the fixed contacts and the corresponding movable contact, the said link having a breaking strength that is higher than a maximum force exerted on the movable contact, during the movement of the contact holder from its first position to its second position. The maximum force for example is equal to 3.1 N (Newton), preferably to 2.9 N. Thus, when the weld is detected, the switching device is no longer usable since the or each movable contact is immobilised on the corresponding fixed contacts. This detection is for example viewable by an external operator by means of mechanical indicators. The existing switching devices thus provide the ability, once the or each movable contact is permanently welded on to the corresponding fixed contacts, to detect and indicate this weld to the operator, but do not provide the ability to anticipate and prevent the welding of the or each movable contact on to the corresponding fixed contacts. Such switching devices are presented in the patent applications nos EP-A-1 744 339 and EP-A-1 610355.

In additional, the document WO-A1-2004/057 634 presents a known switching device in which is measured the expanding of a spring holding in place the or each movable contact, in order to determine the wear on the or each movable contact and the corresponding fixed contacts. Such a device may be used to determine the wear on the contacts, and thus the remaining useful life of the device. However, this device does not provide the ability to anticipate the welding of the or each movable contact on to the corresponding fixed contacts and nor does it provide the ability to determine with precision the remaining useful life of the switching device.

The objective of the invention is therefore to offer a switching device that provides the ability to anticipate the welding of the or each movable contact on to the corresponding fixed contacts and to determine in an optimised manner its remaining useful life of contacts before welding of the contacts thereof.

To this end, the object of the invention relates to a switching device comprising at least one pair of fixed contacts and, for the or each pair of fixed contacts, a movable contact that is movable between a closed position and an open position, the fixed contacts being, in the closed position of the movable contact, electrically connected to one another via the movable contact and being electrically isolated from one another in the open position of the movable contact; a contact holder capable of holding in place the or each movable contact, the contact holder being movable, in a vertical direction between a first position corresponding to the closed position of the or each movable contact and a second position corresponding to the open position of the or each movable contact, and an actuator capable of actuating a translational movement of the contact holder between its first and second positions.

In accordance with the invention, the switching device comprises:
- a plate capable of applying a force on the movable contact holder, the actuator being capable of actuating the translational movement of the contact holder between its first and second positions via the actuation of the movement of the plate, the plate being movable relative to the movable contact holder,
- a sensor capable of measuring the movement of the movable plate, along the vertical direction relative to the movable contact holder, during the actuation of the movement of the plate in order to drive the translational movement of the contact holder from its first position to its second position, and
- a detection member for detecting a malfunction in the switching device based on at least one value measured by the sensor.

Thanks to the invention, the switching device is capable of detecting the occurrence of a fault or malfunction in the switching device, which provides the ability in particular to prevent the welding between the fixed contacts and the or each corresponding movable contact. It is thus possible to replace the switching device in an electrical installation before it ceases to be operational. In addition, based on the frequency of detection of the fault or malfunction, it is also possible to determine whether the switching device is indeed well suited to the electrical installation.

According to other advantageous aspects of the invention, the switching device further includes one or more of the following characteristic features, taken into consideration individually or in accordance with all technically permissible combinations:
- the malfunction detected by the detection member corresponds to the presence of at least one micro weld between at least one of the fixed contacts and the corresponding movable contact, the micro weld corresponding to the presence of a first link between one of the fixed contacts and the corresponding movable contact, the first link having a breaking strength that is less than or equal to a maximum force exerted on the movable contact, during the actuation of the movement of the plate in order to cause the translational movement of the contact holder from its first position to its second position;
- the sensor is a force sensor, preferably a piezoelectric sensor;
- the sensor comprises a main part translationally secured to the movable contact holder, along the vertical axis and a force measuring sensor probe, which is movable relative to the main part;
- the force measuring sensor probe is movable in translational motion relative to the main part, along the vertical direction, over a distance comprised between 1 mm and 20 mm, preferably between 5 mm and 15 mm, while the plate is capable of applying a force on the force measuring sensor probe so as to move the movable contact holder into its second position, during the actuation of the movement of the plate in order to cause the translational movement of the contact holder from its first position to its second position;

along the vertical direction the plate is arranged to be facing the force measuring sensor probe, at a predetermined distance from the said sensor probe;

the contact holder is capable of holding in place the or each movable contact by means of a first spring;

the movable plate is connected to the contact holder by means of a second spring, while during the actuation of the movable plate in order to drive the translational movement of the contact holder from its first position to its second position, the movable plate is capable of exerting a force on the second spring so as to move the movable contact holder to its second position;

the second spring is a prestressed spring capable of applying on the movable plate a force in a direction opposite to that of the movement of the movable plate during the actuation of the movable plate in order to drive the translational movement of the contact holder from its first position to its second position;

the malfunction detection member comprises a comparison means for comparing the measured values with a predetermined threshold value, while the detection member is capable of detecting the malfunction during the actuation of the movable plate in order to move the contact holder from its first position to its second position, when the values measured by the sensor are greater than the predetermined threshold value;

during the actuation of the movable plate in order to drive the translational movement of the contact holder from its first position to its second position:

the detection member is capable of detecting the fault between at least one of the fixed contacts and the corresponding movable contact, when the values measured by the sensor are greater than the predetermined threshold value for a first predetermined time period, comprised within a predetermined time interval, the detection member is capable of detecting a weld between at least one of the fixed contacts and the corresponding movable contact, when the values measured by the sensor are greater than the predetermined threshold value for a second predetermined time period, that is greater than the maximum value of the time interval, the weld corresponding to the presence of a second link between one of the fixed contacts and the corresponding movable contact, the second link having a breaking strength that is higher than a maximum force exerted on the movable contact, during the actuation of the movement of the plate in order to drive the translational movement of the contact holder from its first position to its second position;

the detection member comprises a computing element capable of determining, based on the measured values, an estimated number of opening-closing cycles of the movable contact, prior to the welding between at least one of the fixed contacts and the corresponding movable contact, the weld corresponding to the presence of a second link between one of the fixed contacts and the corresponding movable contact, the said second link having a breaking strength that is higher than a maximum force exerted on the movable contact, during the actuation of the movement of the plate in order to drive the translational movement of the contact holder from its first position to its second position.

The object of the invention also relates to a detection method for detecting a malfunction in a switching device including at least one pair of fixed contacts and, for the or each pair of fixed contacts, a movable contact that is movable between a closed position and an open position, the fixed contacts being, in the closed position of the movable contact, electrically connected to one another via the movable contact and being electrically isolated from one another in the open position of the movable contact, a contact holder capable of holding in place the or each movable contact, the contact holder being movable, along a vertical direction, between a first position corresponding to the closed position of the or each movable contact and a second position corresponding to the open position of the or each movable contact, and an actuator capable of actuating the translational movement of the contact holder between its first and second positions.

In accordance with the invention, the method further includes the steps of:

the actuation of the movement of a plate by the actuator, the device including the plate capable of applying a force on the movable contact holder, the plate driving the translational movement of the contact holder from its first position to its second position, the plate being movable relative to the movable contact holder, the measurement, during the translational movement of the contact holder from its first position to its second position, of the movement of the plate along the vertical direction, relative to the movable contact holder, and the detection of a malfunction in the switching device based on at least one value measured during the step of measuring.

According to other advantageous aspects of the invention, the switching device further includes one or more of the following characteristic features, taken into consideration individually or in accordance with all technically permissible combinations:

during the detection step, the malfunction detected corresponds to the presence of at least one micro weld between at least one of the fixed contacts and the corresponding movable contact, the micro weld corresponding to the presence of a first link between one of the fixed contacts and the corresponding movable contact, the first link having a breaking strength that is less than or equal to a maximum force exerted on the movable contact, during the actuation step;

following the measurement step, the method includes a step of transmitting of the values measured during the measurement step to a detection member for detecting the malfunction, and during the detection step, the detection member detects a malfunction if the measured values are greater than a predetermined threshold value, whereas following the detection step the detection member performs a step consisting of the sending of a message indicating to an operator whether a fault between at least one of the fixed contacts and the corresponding movable contact has been detected.

The invention will be better understood and other advantages thereof will become apparent in the light of the description that follows, provided purely by way of non limiting example, and with reference being made to the drawings in which.

Figure 1:
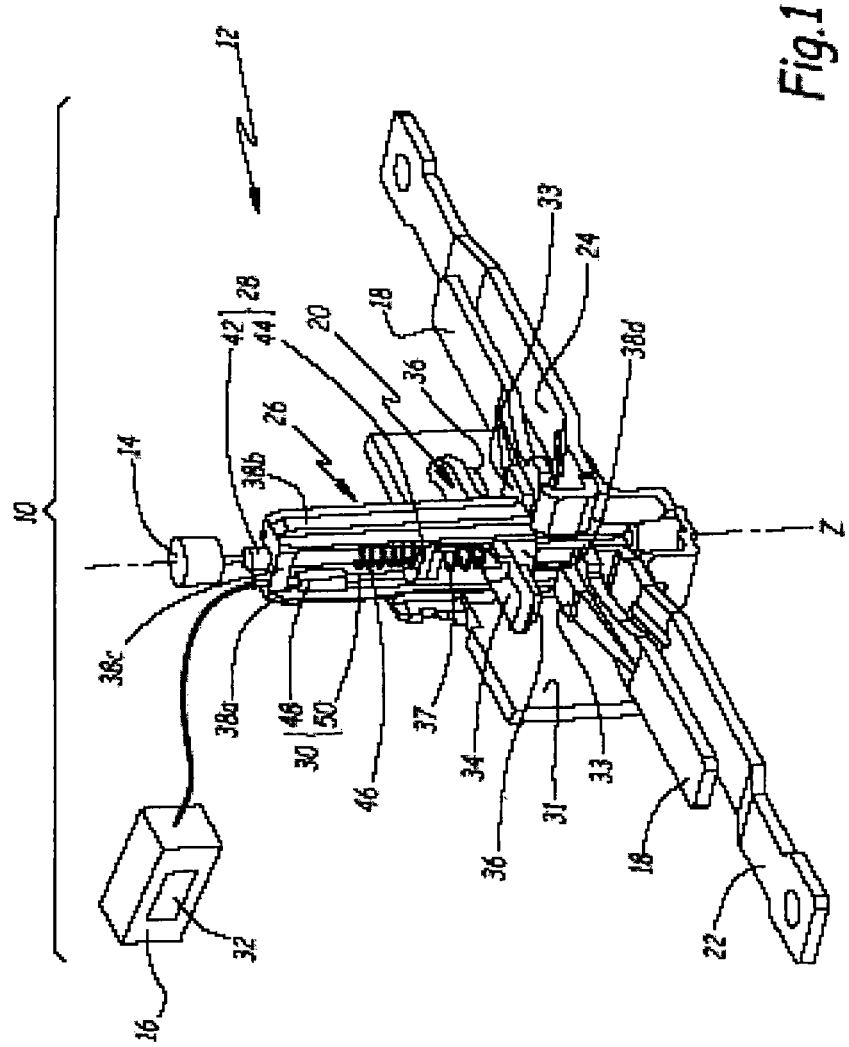
FIG. 1 is a schematic perspective representation of a contactor switch according to a first embodiment of the invention, wherein the contactor switch is single phase contactor switch.

In the FIG. 1, a contactor switch 10 comprises of a switching block 12, an actuator 14 and a detection member 16 for detecting a malfunction.

The switching block 12 comprises two fixed contacts 18 and a movable contact 20 movable between a closed position and an open position. The fixed contacts 18 are, in the closed position of the movable contact 20, electrically connected to one another via the movable contact 20, and are electrically isolated from one another in the open position of the movable contact 20.

The reference Z denotes a vertical direction along which the movable contact 20 is capable of moving. The vertical direction Z forms a longitudinal axis of the contactor switch 10.

The switching block 12 includes an input terminal 22 enabling input of the current into the contactor switch 10 and an output terminal 24 enabling output of the current from the contactor switch 10.

The switching block 12 includes a contact holder 26 capable of holding the movable contact 20 and of driving it in translational movement along the vertical direction Z. The contact holder 26 is movable between a first position corresponding to the closed position of the movable contact 20 and a second position corresponding to the open position of the movable contact 20.

The switching block 12 includes a movable member 28, movable along the vertical direction Z, connected to the actuator 14 and capable of being actuated by the actuator 14 in order to actuate a translational movement of the contact holder 26 between its first and second positions, and thereby to actuate the moving of the movable contact 20.

The switching block 12 also includes a force sensor 30 fixed to the contact holder 26.

The switching block 12 includes a breaking chamber 31 for an electric arc formed between the fixed contacts 18 and the movable contact 20, during the opening of the movable contact 20.

The actuator 14 comprises a coil, not shown, capable of actuating the movement of the movable member 28 causing the translational movement of the contact holder 26 between its first and second positions. The coil is capable of actuating the movement of the movable member 28 and thus of the contact holder 26 depending upon the current traversing therethrough.

The detection member 16 is capable of detecting a malfunction in the contactor switch 10, such as the appearance of at least one micro weld between the movable contact 20 and the fixed contacts 18 based on the values measured by the sensor 30. The term micro weld here, signifies the presence of a first link between one of the fixed contacts 18 and the corresponding movable contact 16, the said first link having a breaking strength that is less than or equal to a maximum force exerted on the movable contact, during the actuation of the movement of the movable member 28 in order to cause the translational movement of the contact holder 26 from its first position to its second position. The maximum force is for example equal to 3.1 N, preferably 2.9 N.

The detection member 16 is also capable of detecting the appearance of a weld between the movable contact 20 and one of the fixed contacts 18 based on the values measured by the sensor 30. The weld corresponding to the presence of a second link between the fixed contacts 18 and the corresponding movable contact 20, the said second link having a breaking strength that is greater than the maximum force exerted on the movable contact, during the actuation of the movement of the plate 44 in order to cause the translational movement for the contact holder 26 from its first position to its second position. The breaking strength of the weld is for example greater than 3.5 N.

The detection member 16 includes a comparison software 32 for comparing the values measured with a first predetermined threshold value S1. The first threshold value S1 is, for example, comprised between 3 N and 3.1 N. The detection member 16 is capable of detecting the appearance of micro welds between at least one of the fixed contacts 18 and the movable contact 20, during the actuation of the movable member 28 in order to move the contact holder 26 from its first position to its second position, when the values measured by the sensor 30 are greater than the first predetermined threshold value S1 for a first time period T1 comprised within a predetermined time interval I1. The time interval I1 is for example equal to [0.1 ms; 100 ms]. The detection member 16 is capable of detecting a weld between at least one of the fixed contacts 18 and the movable contact 20, when the values measured by the sensor 30 are greater than the first predetermined threshold value S1 for a second predetermined time period T2, that is greater than the maximum value of the time interval I1.

Each fixed contact 18 includes a contact pad 33. The two fixed contacts 18 of the switching block 12 are respectively connected to the input terminal for the current 22 and to output terminal for the current 24.

Each movable contact 20 comprises a central part 34 and two contact pads 36.

The contact holder 26 is in the form of a frame, extending along the vertical direction Z and including two vertical walls 38a, 38b, which are substantially parallel and two horizontal walls 38c, 38d, that is a top wall 38c, and a bottom wall 38d, connecting between them the vertical walls 38a, 38b. The contact holder 26 also includes an intermediate wall 39 extending perpendicularly to the vertical direction Z. The intermediate wall 39 forms a boundary between a first stage 40a and second stage 40b, aligned along the vertical direction Z. The first stage 40a is closer to the fixed contacts 18 than the second stage 40b.

The movable contact holder 26 holds in place the movable contact 20 by means of the first spring 37 positioned between the contact holder 26 and the movable contact 20 along the vertical direction Z. More precisely, the first spring 37 is positioned between the intermediate wall 39 and the central part 34.

The movable member 28, is arranged between the vertical walls 38a, 38b on the one hand, and above the intermediate wall 39 on the other hand. In other words, the movable member 28 is positioned at the level of the second stage 40b. The movable member 28 comprises of a rod 42 and a force transmission plate 44 for transmitting the force to the sensor 30. The plate 44 is connected to the contact holder 26 by means of a second spring 46. The movable member 28 is capable, via the plate 44 and the second spring 46, of applying a force on the movable contact holder 26 so as to move it from its first position to its second position.

More generally, the movable member 28 is capable of being actuated by the actuator 14 in order to move the contact holder 26 between its first and second positions. The actuator 14 is thus capable of triggering the movement of the movable member 28 and therefore of the contact holder 26 from its first position to its second position, by interrupting the current flowing through its coil.

The movable member 28 and the plate 44 are movable relative to the contact holder 26.

The sensor 30 is fixed to the vertical wall 38a and extends between the top wall 38c and the intermediate wall 39. The sensor 30 is thus positioned within the second stage 40b. The sensor 30 is a force sensor, and preferably a piezoelectric sensor.

The sensor 30 comprises a main part 48 that is translationally secured to the movable contact holder 26, along the vertical direction Z and fixed to the vertical wall 38a, as well as a force measuring sensor probe 50 for measuring the force. The probe 50 is movable relative to the main part 48. The probe 50 is, for example, sliding along the vertical direction Z, within the main part 48.

The comparison software 32 is capable of comparing the values of force measured by the sensor 30 with the predetermined first threshold value S1.

The first spring 37 is, when the movable contact 20 is in the closed position, capable of exerting a pressure force, along the vertical direction Z, so as to press the movable contact 20 against the fixed contacts 18. Thus, in the event of wear on the contact pads 33, 36, the first spring 37 allows for a better closing of the movable contact 20.

The lower wall 38d is capable of applying a force on the central part 34, during the actuation of the movement of the plate 44 in order to cause the translational movement of the contact holder 26 from its first position to its second position.

The intermediate wall 39 is integrally secured mechanically to the vertical walls 38a, 38b and the horizontal walls 38c, 38d, in a manner such that a mechanical force applied to the intermediate wall 39 generally acts on the contact holder 26.

The rod 42 is integrally secured to the plate 44 and its movement is actuated by the actuator 14.

The plate 44 is positioned between the wall intermediate 39 and the upper wall 38c. The plate 44 is, along the vertical direction Z, in contact with the probe 50 of the sensor 30 on the one hand, and in contact with the intermediate wall 39 on the other hand. The plate 44 is capable of applying a force on the sensor 30, during the actuation of the movable member 28 in order to cause the translational movement of the contact holder 26 from its first position to its second position. The plate 44 is capable of apply a force on the wall 40, during the actuation of the movable member 28 in order to cause the translational movement of the contact holder 26 from its second position to its first position.

The second spring 46 is, for example, a prestressed spring capable of applying on the plate 44 a force in a direction opposite to that of the movement of the plate 44 during the actuation of the translational movement of the contact holder 26 from its first position to its second position. The second spring 46 extends along the vertical direction Z between the plate 44 and the upper wall 38c.

The force measuring sensor probe 50 is capable of moving translationally relative to the main part 48 along the vertical direction Z, over a distance comprised between 1 mm and 20 mm, preferably between 5 mm and 15 mm.

Figure 2:
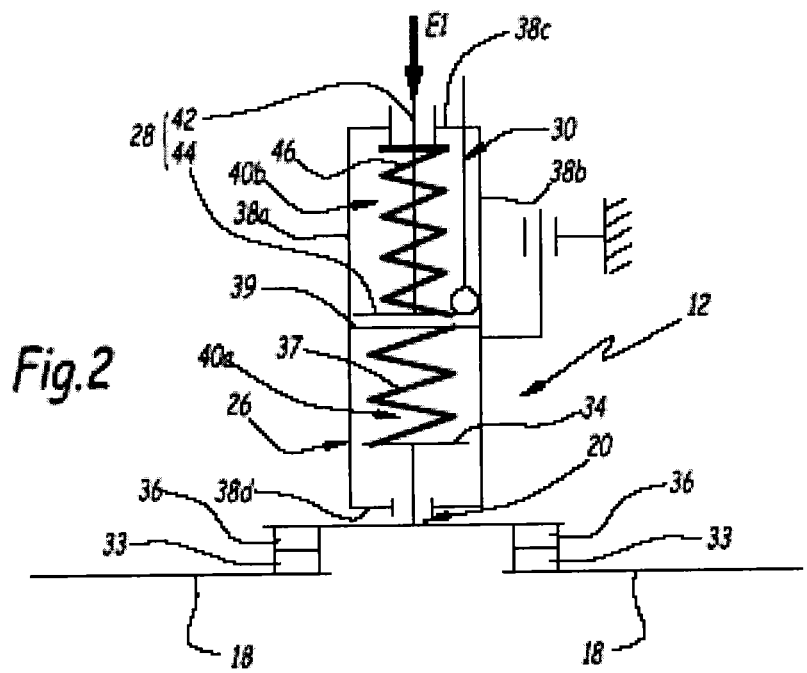
FIG. 2 is a wire frame view of the contactor switch shown in FIG. 1 comprising a movable contact in the closed position relative to the corresponding fixed contacts.

The FIG. 2 shows the contactor switch 10 with the movable contact 20 in the closed position. During the moving of the movable contact 20 from its open position to its closed position, the movable member 28 and more precisely the plate 44 is actuated so as to move the contact holder 26 from its second position to its first position. Thus, as presented in the FIG. 2, a closing force E1 is applied by the actuator 14 on the movable member 28, in order to move the movable member 28, along the vertical direction Z, to the fixed contacts 18. The plate 44 then comes into contact with the intermediate wall 39 and by solidarity of movement drives the contact holder 26 from its second position to its first position. Then, the intermediate wall 39 transfers its movement to the movable contact 20 through the first spring 37. The movable contact 20 is then in the closed position.

Figure 3:
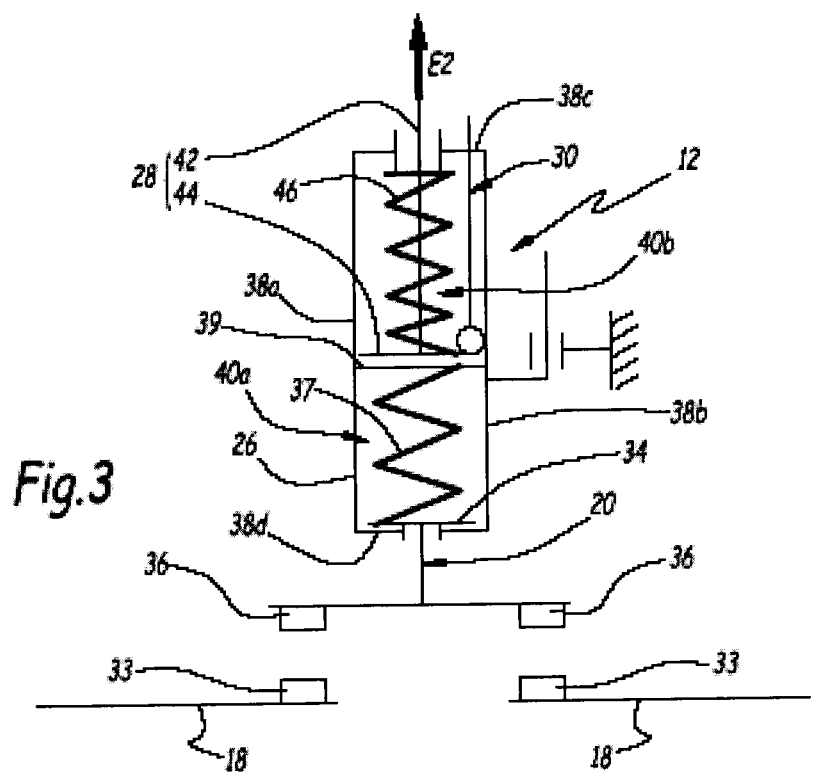
FIG. 3 is a view similar to that shown in FIG. 2 in which the movable contact is the open position relative to the fixed contacts.

In the FIG. 3, the movable contact 20 is in the open position. During the moving of the movable contact 20 from its closed position to its open position, the actuator 14 applies an opening force E2 on the movable member 28, so as to move it in a direction opposite to the fixed contacts 18, along the vertical direction Z. The movable member 28, and more precisely the plate 44 transfers this opening force E2 to the contact holder 26 through the second spring 46.

When no fault or malfunction and in particular no micro weld is present between the fixed contact pads 33 and the movable contact pads 36, the sensor 30 will measure substantially no force since the second spring 46 is prestressed. The plate 44 thus applies a force on the second spring 46, which is transmitted to the top wall 38c of the contact holder 26. The contact holder 26 is then moved from its first position to its second position. The lower wall 38d of contact holder 26 is thus moved in order to come into contact with the central part 34, and drives the movable contact 20 to its open position.

Figure 4:
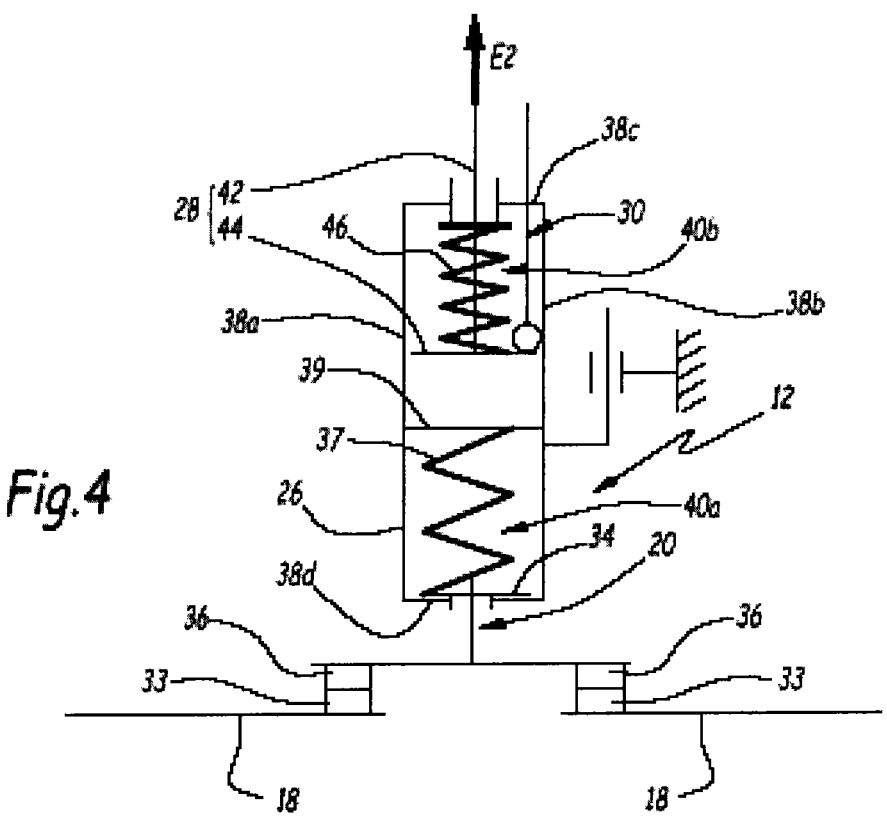
FIG. 4 is a view similar to that shown in FIG. 3, during actuation of the opening of the movable contact and the appearance of a fault or malfunction, such as micro welds, between the movable contact and the fixed contacts.

In the FIG. 4, the actuator 14 applies the second opening force E2 to the movable member 28 so as to move it in a direction opposite to the fixed contacts 18, along the vertical direction Z. However, a fault, such as a micro weld between the movable contact 20 and the fixed contacts 18 appears. Thus, the movable contact 20 is for a short time period less than 100 ms immobilised against the fixed contacts 18. More precisely, when the opening force E2 is applied to the movable member 28, the plate 44 transmits this force to contact holder 26 via the second spring 46. Then the contact holder 26 moves from its first position to its second position. However, since the movable contact 20 is micro welded, when the end 41 comes into contact with the central part 34, the movement of the contact holder 26 is stopped. The contact holder 26 is then immobilised for a time period less than 100 ms. During this immobilisation of the contact holder 26, the plate 44 continues its movement and comes to apply a force on the second spring 46, this force being greater than the prestress of the second spring 46. The plate 44 then enters into contact with the probe 50 and moves it. The sensor 30 then measures the force corresponding to a detection of a fault, such as the presence of one or more micro welds, when the measured data values are greater than the first threshold value S1. The contact holder 26 is immobilised until the force that it applies on the central part 34 is sufficient to break the micro weld or micro welds, that is to say to separate the movable contact 20 from the fixed contacts 18. Then, once the micro welds are broken, the contact holder contact 26 continues to move towards its second position and the switching block 12 is found in the configuration shown in FIG. 2. Advantageously, the detection member 16 includes a computing member, not shown, capable of determining, based on the measured data, an estimated number of cycles of opening/closing of the movable contact 20 prior to the weld appearing between at least one of the fixed contacts 18 and the movable contact 20.

Figure 5:
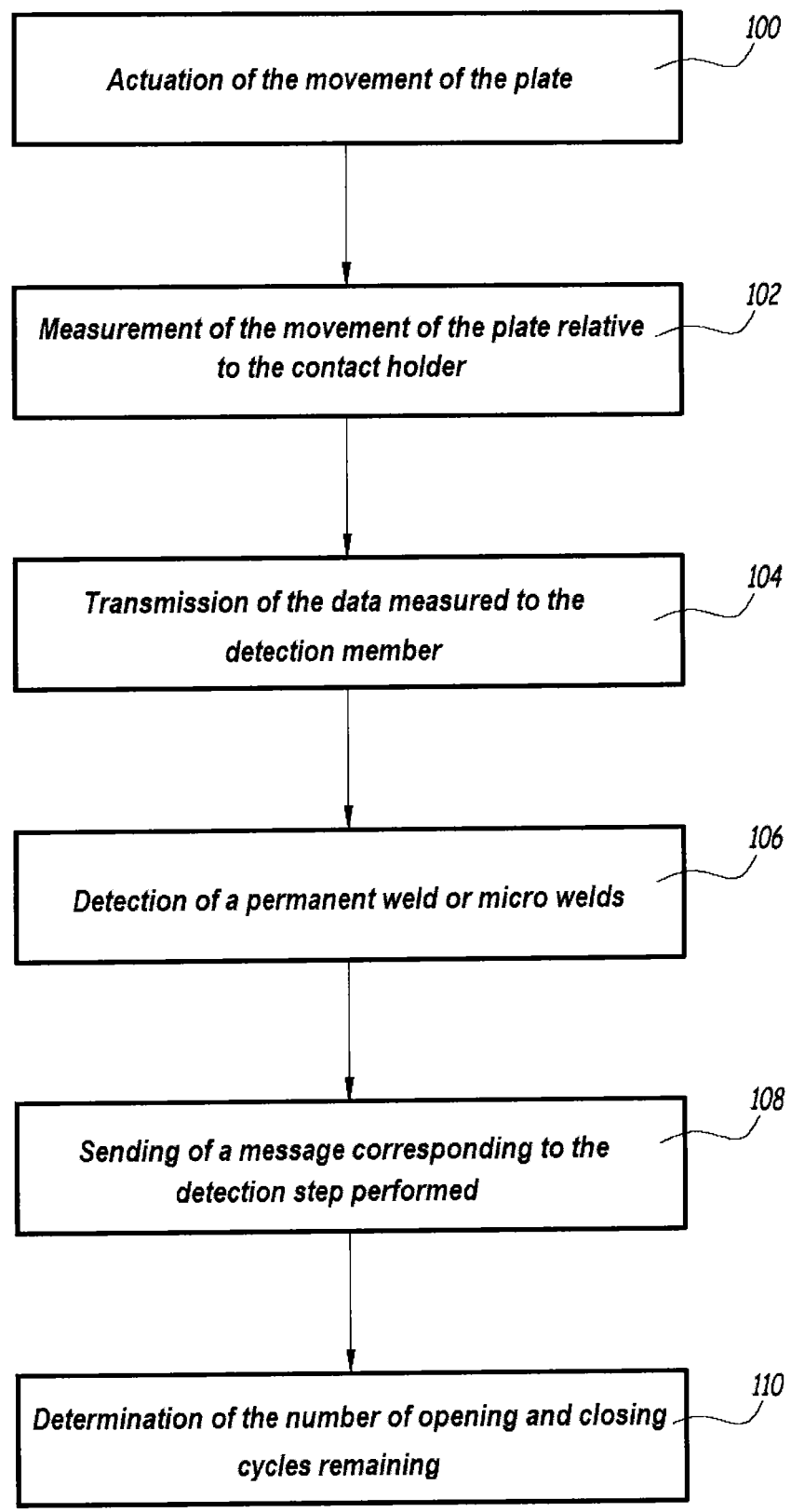
FIG. 5 is a flowchart of a method for detecting a fault or malfunction, such as micro welds, in the contactor switch shown in FIG. 1 in accordance with the invention.

The method for detecting a malfunction or fault, such as one or more micro welds between the movable contact 20 and the fixed contacts 18, in the contactor switch 10 will be presented below by making use of the FIG. 5. During a first step 100 the actuator actuates the movable member 28 and more precisely the plate 44 in order to move the contact holder 26 from its first position to its second position. Then, following the step 100, during a step 102, the sensor 30 measures the movement of the plate 44 relative to the contact holder 26, during the translational movement of the contact holder 26 from its first position to its second position. More precisely, in order to detect this movement, the sensor 30 measures the force exerted by the plate 44 on the probe 50. Then, during a step 104, the sensor 30 transmits the data measured during the step 102 to the detection member 16 for detecting the malfunction. Subsequently, during a step 106, the detection member 16 compares, by means of its comparison software 32, the values measured to the first predetermined threshold value S1 and determines the time period during which the measured values are greater than the threshold value S1. Then if the measured values are greater than the first threshold value S1 over the first time period T1, the detection member detects the presence of one or more micro welds. If the measured values are greater than the threshold value S1 over the second time period T2, the detection member detects the presence of a weld between one of the fixed contacts 18 and the movable contact 20. During a step 108, the detection member transmits a message including a data item indicating whether or not one or more micro welds or a weld between the movable contact 20 and at least one of the fixed contacts 18 has been detected. The said message corresponds for example to an acoustic signal tone or to a display on the detection member 16.

In addition, during a step 110 the computing member determines an estimated number of cycles of opening/closing of the movable contact 20 remaining, prior to the weld appearing between at least one of the fixed contacts 18 and the movable contact 20 and transmits this information via, for example, a display on the detector member.

The use of the threshold value S1 and the second prestressed spring 46 makes it possible to not consider the forces applied to the sensor 30, during the opening of the movable contact 20, in the event where no micro weld appears between the movable contact 20 and the fixed contacts 18.

The use of a piezoelectric type sensor makes it possible to determine the intensity of micro weld detected, which provides the ability to determine with high accuracy the estimated number of remaining opening/closing cycles.

The identifying of the micro welds provides the ability to anticipate the welding of the movable contact 20 with the fixed contacts 18. A maintenance operator can thus effect the replacement of the contactor switch 10 before it is totally inoperative, due to the welding between the movable contact 20 and the fixed contacts 18.

In addition, advantageously, the detection member 16 is also capable of measuring the frequency of occurrence of micro welds. It is thus possible by means of measurement of this frequency of occurrence to determine whether the contactor switch is indeed well suited to the need.

Finally, the fact that the sensor 30 is fixed on to the contact holder 26 makes it possible to detect the micro welds while limiting taking into consideration the potential mechanical friction within the contactor switch 10.

Figure 6:
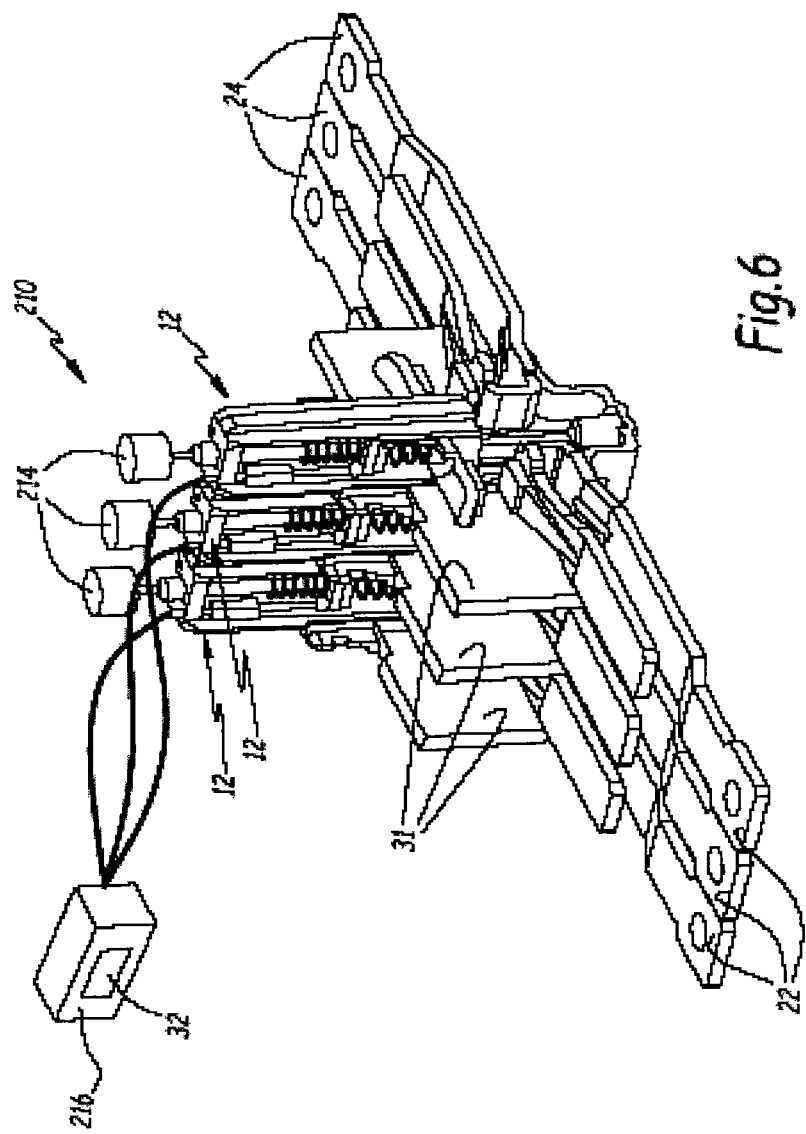
FIG. 6 is a schematic perspective representation of a contactor switch according to a second embodiment of the invention, wherein the contactor switch is a three phase contactor switch.

The FIG. 6 shows a contactor switch 210 according to a second embodiment of the invention. The contactor switch 210 is a three-phase contactor switch which includes three switching blocks 12, such as those presented in the first embodiment. The contactor switch 210 also includes three actuators 214 and a detection member 216, similar respectively, to the actuator 14 and the detection member 16.

In the FIG. 6, the other elements similar to the first embodiment bear the same references and have not been described again.

In this variant embodiment, the detection member 216 is capable of detecting the occurrence of one or more micro welds or a weld in a manner analogous to that which has been presented for the first embodiment. Advantageously, the detection member 216 is capable of identifying each sensor 30 and of also identifying the switching block 12 with which each sensor 30 is associated, in order to determine the switching block 12 for which a malfunction is eventually detected.

The advantages presented for first embodiment are applicable to the second embodiment.

By way of a variant, the second spring 46 is not prestressed or indeed the contactor switch does not include a second spring 46 and, along the vertical direction Z, the plate 44 is facing the force measuring sensor probe 50, at a predetermined distance from the probe 50.

In the case where the contactor switch 10 does not include a second prestressed spring, during the actuation of the movement of the plate 44 in order to drive the contact holder 26 from its first position to its second position, the plate 44 is capable of applying a force on the force measuring sensor probe 50 so as to move the movable contact holder 26 into its second position. The probe 50 thus moves along the vertical direction Z, and then drives the main part 48 which is integrally secured with the contact holder 26. The contact holder 26 is thus moved to its second position and is capable of moving the movable contact 20 into its open position. In this variant embodiment, when no micro weld appears, the value of the force measured by the sensor 30 is of a small magnitude, that is to say less than a second predetermined threshold value S2, since the sensor 30 transmits the force that it receives to the contact holder 26 which is capable of moving. The second threshold value S2 is for example between 0.2 N and 0.4 N. The second threshold value S2 is greater than the first threshold value S1. In the case where the movable contact 20 is micro welded, the force measured by the sensor 30 is of a value greater than the second predetermined threshold value S2 and the detection member 16 detects the malfunction or fault, such as the presence of one or more micro welds.

According to another variant embodiment, the sensor 30 is replaced by any type of sensor capable of measuring the movement of the movable plate 44, along the vertical direction Z relative to the movable contact holder 26, during the actuation of the movement of the plate 44 in order to drive the movement of the contact holder 26 from its first position to its second position.

The invention is applicable more generally to any type of switching device such as auxiliary contacts, or a circuit breaker, and not only to a contactor switch.

The invention claimed is:

1. A switching device, comprising:
   at least one pair of fixed contacts and, for the or each pair of fixed contacts, a movable contact that is movable between a closed position and an open position, the fixed contacts being, in the closed position the movable contact, electrically connected to one another via the movable contact and being electrically isolated from one another in the open position of the movable contact,
   a contact holder capable of holding in place the or each movable contact, the contact holder being movable, along a vertical direction, between a first position corresponding to the closed position of the or each movable contact and a second position corresponding to the open position of the or each movable contact, and an actuator capable of actuating a translational movement of the contact holder between its first and second positions, wherein the switching device includes:

a plate capable of applying a force on the movable contact holder, the actuator being capable of actuating the translational movement of the contact holder between its first and second positions via the actuation of the movement of the plate, the plate being movable relative to the movable contact holder, a sensor capable of measuring the movement of the movable plate along the vertical direction relative to the movable contact holder, during the actuation of the movement of the plate in order to drive the translational movement of the contact holder from its first position to its second position, and a detection member for detecting a fault or malfunction in the switching device based on at least one value measured by the sensor.

2. A device according to claim 1, wherein the detection member is capable of detecting the presence of at least one micro weld between at least one of the fixed contacts and the corresponding movable contact, the micro weld corresponding to the said fault in the switching device and to the presence of a first link between one of the fixed contacts and the corresponding movable contact, the said first link having a breaking strength that is less than or equal to a maximum force exerted on the movable contact, during the actuation of the movement of the plate in order to cause the translational movement of the contact holder from its first position to its second position.

3. A device according to claim 1, wherein the sensor is a force sensor, preferably a piezoelectric sensor.

4. A device according to claim 3, wherein the sensor comprises a main part translationally secured to the movable contact holder, along the vertical axis and a force measuring sensor probe, which is movable relative to the main part.

5. A device according to claim 4, wherein the force measuring sensor probe is movable in translational motion relative to the main part along the vertical direction, over a distance comprised between 1 mm and 20 mm and wherein the plate is capable of applying a force on the force measuring sensor probe so as to move the movable contact holder into its second position, during the actuation of the movement of the plate in order to cause the translational movement of the contact holder from its first position to its second position.

6. A device according to claim 5, wherein along the vertical direction the plate is arranged to be facing the force measuring sensor probe, at a predetermined distance from the said sensor probe.

7. A device according to claim 1, wherein the contact holder is capable of holding in place the or each movable contact by means of a first spring.

8. A device according to claim 1, wherein the movable plate is connected to the contact holder by means of a second spring, and wherein during the actuation of the movable plate in order to cause the translational movement of the contact holder from its first to its second position, the movable plate is capable of exerting a force on the second spring so as to move the movable contact holder to its second position.

9. A device according to claim 8, wherein the second spring is a prestressed spring capable of applying on the movable plate a force in a direction opposite to that of the movement of the movable plate during the actuation of the movable plate in order to drive the translational movement of the contact holder from its first position to its second position.

10. A device according to claim 1, wherein the malfunction detection member comprises a comparison means for comparing the measured values with a predetermined threshold value, and wherein the detection member is capable of detecting the malfunction during the actuation of the movable plate in order to move the contact holder from its first position to its second position, when the values measured by the sensor are greater than the predetermined threshold value.

11. A device according to claim 10, wherein during the actuation of the movable plate in order to drive the translational movement of the contact holder from its first position to its second position:

the detection member is capable of detecting the malfunction or fault between at least one of the fixed contacts and the corresponding movable contact, when the values measured by the sensor are greater than the predetermined threshold value for a first predetermined time period, comprised within a predetermined time interval, the detection member is capable of detecting a weld between at least one of the fixed contacts and the corresponding movable contact, when the values measured by the sensor are greater than the predetermined threshold value for a second predetermined time period, that is greater than the maximum value of the time interval, the weld corresponding to the presence of a second link between one of the fixed contacts and the corresponding movable contact, the said second link having a breaking strength that is higher than a maximum force exerted on the movable contact, during the actuation of the movement of the plate in order to drive the translational movement of the contact holder from its first position to its second position.

12. A device according to claim 1, wherein the detection member comprises a computing element capable of determining, based on the measured values, an estimated number of opening-closing cycles of the movable contact prior to the welding between at least one of the fixed contacts and the corresponding movable contact, the weld corresponding to the presence of a second link between one of the fixed contacts and the corresponding movable contact, the said second link having a breaking strength that is higher than a maximum force exerted on the movable contact, during the actuation of the movement of the plate in order to drive the translational movement of the contact holder from its first position to its second position.

13. A detection method for detecting a malfunction in a switching device, the switching device including:

at least one pair of fixed contacts and, for the or each pair of fixed contacts, a movable contact that is movable between a closed position and an open position, the fixed contacts being, in the closed position the movable contact, electrically connected to one another via the movable contact and being electrically isolated from one another in the open position the movable contact, a contact holder capable of holding in place the or each movable contact, the contact holder being movable, along a vertical direction, between a first position corresponding to the closed position of the or each movable contact and a second position corresponding to the open position of the or each movable contact, and an actuator capable of actuating the translational movement of the contact holder between its first and second positions, wherein the method further includes the steps of:

the actuation of the movement of a plate by the actuator, the device including the said plate capable of applying a force on the movable contact holder, the plate driving the translational movement of the contact holder from its first position to its second position, the plate being movable relative to the movable contact holder, the measurement, during the translational movement of the contact holder from its first position to its second position, of the movement of the plate, along the vertical direction relative to the movable contact holder, and the detection of a malfunction in the switching device based on at least one value measured during the step of measuring.

14. A method according to claim 13, wherein, during the detection step, a detection member detects the presence of at least one micro weld between at least one of the fixed contacts and the corresponding movable contact, the micro weld corresponding to the said fault in the switching device and to the presence of a first link between one of the fixed contacts and the corresponding movable contact, the said first link having a breaking strength that is less than or equal to a maximum force exerted on the movable contact, during the actuation step.

15. A method according to claim 13, wherein, following the measurement step, the method includes a step of:

transmitting of the values measured during the measurement step to a detection member for detecting the malfunction, and wherein during the detection step, the detection member detects a malfunction if the measured values are greater than a predetermined threshold value, and wherein following the detection step the detection member performs the following step of:

sending of a message indicating to an operator whether a malfunction or fault between at least one of the fixed contacts and the corresponding movable contact has been detected.

* * * * *